United States Patent
Goldman et al.

(10) Patent No.: US 9,933,284 B2
(45) Date of Patent: Apr. 3, 2018

(54) MULTI-TRACK ABSOLUTE ENCODER

(71) Applicant: Novanta Corporation, Bedford, MA (US)

(72) Inventors: Andrew M. Goldman, Stow, MA (US); Marc A. Bernard, Superior, CO (US); William G. Thorburn, Danvers, MA (US)

(73) Assignee: Novanta Corporation, Bedford, MA (US)

( * ) Notice: Subject to any disclaimer, the term of this patent is extended or adjusted under 35 U.S.C. 154(b) by 177 days.

(21) Appl. No.: 14/836,021

(22) Filed: Aug. 26, 2015

(65) Prior Publication Data
US 2017/0059367 A1    Mar. 2, 2017

(51) Int. Cl.
*G01D 5/34* (2006.01)
*G01D 5/347* (2006.01)

(52) U.S. Cl.
CPC ..... *G01D 5/34776* (2013.01); *G01D 5/34715* (2013.01); *G01D 5/34792* (2013.01)

(58) Field of Classification Search
CPC ........................... G01D 5/2454; G01D 5/2455
USPC ........................................ 250/231.13–231.19
See application file for complete search history.

(56) References Cited

U.S. PATENT DOCUMENTS

| | | | |
|---|---|---|---|
| 4,633,224 A | * | 12/1986 | Gipp ................. G01D 5/34776 250/231.14 |
| 4,959,542 A | | 9/1990 | Stephens |
| 6,366,047 B1 | | 4/2002 | Horwitz et al. |
| 7,499,827 B2 | | 3/2009 | Gordon-Ingram |

* cited by examiner

*Primary Examiner* — Thanh Luu
(74) *Attorney, Agent, or Firm* — BainwoodHuang

(57) ABSTRACT

An optical position encoder includes a scale having multiple tracks separated in a direction perpendicular to travel, the tracks including an incremental track and an absolute track, the scale interacting with an incident first light beam to generate a second light beam having components carrying respective optical patterns produced by the incremental track and absolute track respectively. The encoder further includes a set of optical detectors including at least first and second detector arrays of differing properties to detect the respective optical patterns produced by the incremental track and absolute track respectively, each of the first and second detector arrays spanning multiple tracks of the scale and configured to respond to a respective detector-specific component of the second light beam more strongly than to another component of the second beam specific to another of the detector arrays.

11 Claims, 2 Drawing Sheets

MULTI-TRACK ABSOLUTE ENCODER

SUMMARY

Incremental encoders typically employ a scale with a periodically repeating scale pattern, such as a series of equally spaced line segments, and a read head with an optical detector to measure relative movement between the read head and scale. The encoder tracks position as a count of periods of the scale pattern encountered during the relative movement. Typically this count is referenced to some type of positional reference mark also detected by the read head. Position information is generally interpolated into finer increments within each incremental period of the scale pattern. The position within an incremental period may be considered absolute, in the sense that the phase within a period can be detected upon power up of the read head without requiring relative motion to establish a positional reference.

An absolute encoder is one in which each section of the scale is unique, and position is generally detected directly at each point rather than by counting periods from a positional reference mark. Position may be determined upon power up without read head motion on any part of the scale, i.e., there is no need to move the read head to encounter a positional reference mark to enable position information to be derived from subsequent movement relative to that mark.

It is common for absolute encoders to include a fine incremental track to achieve desired resolution and accuracy, along with one or more absolute tracks to identify absolute position. In this case, the absolute position is linked to the incremental position within one period. Generally, there have been two types of absolute encoder:

1. Absolute patterns using a number of binary tracks of different periods. Each successive track adds another bit of absolute information. A Gray coding scheme may be used.

2. More complex absolute patterns using one or more tracks, the patterns usually made up of discrete binary code words or a pseudorandom code, linked to a separate incremental track. In this case each absolute track pattern contains multiple bits of absolute position information.

More recently, a third type of absolute encoder has been developed:

3. A single track carrying both the incremental and absolute position information. This may be referred to as an incremental track with absolute position information "embedded" therein by selective modification of the marks that make up the incremental pattern. For example, marks may be added, removed, or altered in size or shape. The absolute information is generally in the form of discrete binary code words or a pseudorandom code.

In common encoder design language, if information is "embedded" in a single track, it refers to a feature change of the incremental track in the direction of travel. Encoders of type 1 or 2 above do not use such "embedded" absolute position information. Rather, an incremental track provides incremental position information only, and absolute position information is encoded in one or more additional tracks separated from the incremental track in the direction perpendicular to travel.

One example an encoder of type 3 above is shown in U.S. Pat. No. 7,499,827. One of its significant advantages is that its sensitivity to "yaw" (rotational offset between read head and scale) is much less than for encoders of types 1 and 2 that employ separate absolute tracks, which leads to larger alignment tolerances, less need for customer calibration, and generally more robust linking of absolute position information to the incremental position information. However, because the type 3 encoder fundamentally requires a non-periodic scale pattern, it is impractical to use a periodic diffractive optic to optically filter the incremental scale position information, which is done in many high accuracy encoder systems and is described in U.S. Pat. No. 4,959,542. In the example of U.S. Pat. No. 7,499,827, an imaging system is instead used which has some optical disadvantages:

1. For a given numerical aperture, the field of view and depth of focus is proportional to the focal length which can increase the required size of the read head, standoff, and mechanical envelope of the sensor. Higher numerical apertures come with either increased spherical aberration or reduced depth of focus in the case of an asphere.

2. A change in the standoff from the read head to the scale will cause the object (scale) plane to shift, which can rapidly reduce signal contrast.

3. Complex lens systems may be implemented to improve the above disadvantages; however, the system complexity and cost will be increased dramatically.

The current disclosure is directed to an encoder system with a multi-track scale made up of separate narrow tracks. A number of the tracks on the scale are incremental tracks providing incremental information only, while others are absolute tracks providing absolute information. With proper detector geometry and/or optical filters, single detectors may each view the entire width of the scale in the direction perpendicular to travel, and both the incremental information and absolute information can be extracted from detector output signals by processing electronics. Alternatively, separate detector channels may be used for individual tracks or subsets of the tracks.

While an imaging system may be used to image such a scale onto the detector, the separation of incremental and absolute tracks enables the use of a periodic diffractive optic to optically filter the incremental scale position information, such as shown in U.S. Pat. No. 4,959,542. A periodic diffractive optic between the scale and detector offers the significant advantage of optically filtering out effects of scale defects or contamination from the signal, producing accurate optical fringes on the detector. Moreover, this flexibility is achieved along with reduced yaw sensitivity over previous multi-track absolute encoders such as the types described above, partly due to the repetition of incremental and absolute information by the configuration and placement of the tracks across the width of the scale.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
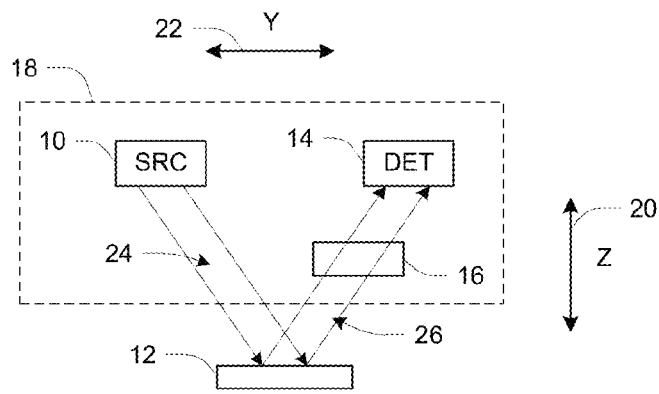
FIG. 1 is a schematic diagram of an optical position encoder.

FIG. 1 shows an optical position encoder including a light source (SRC) 10, a scale 12, detectors (DET) 14, and a filtering optic or "optic" 16. In one embodiment the source 10, detectors 14 and optic 16 are part of a unitary mechanical subassembly referred to as a read head 18. Generally the optical position encoder is used to track the relative positions of two objects, with the scale 12 typically attached to one object and the read head 18 typically attached to the other. In many cases one of the read head 18 or scale 12 is part of some structure serving as a mechanical reference, such as a frame or housing of an electromechanical component, while the other of the two is attached or otherwise part of a moving member of the electromechanical component, i.e., a member that moves with respect to such frame or housing.

Figure 2:
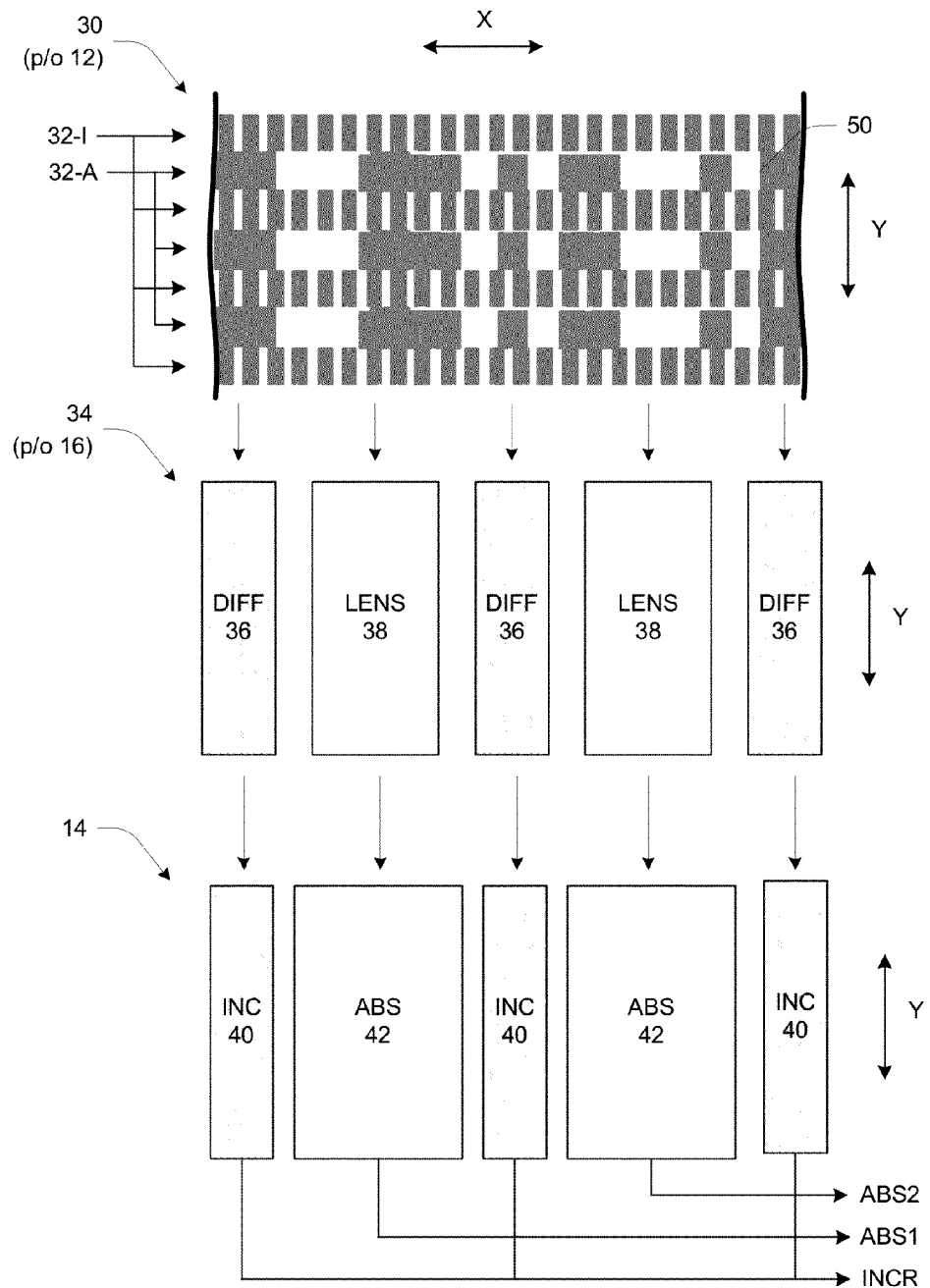
FIG. 2 is a schematic depiction of a scale, filtering optic, and detectors of an optical position encoder.

In the present description it is assumed that relative linear motion or position is of interest and that the optical position encoder is a linear position encoder. In this case it is convenient to use a three-axis reference system in which an X direction is the direction of relative motion, a Z direction 20 is a direction of separation between the read head 18 and scale 12, and a Y direction 22 is a third direction orthogonal to both X and Z. The X direction is into the page in FIG. 1. As shown in FIG. 2, the Y direction 22 is across the width of the scale 12. For a linear encoder the scale 12 is typically much longer than the X-direction width of the read head 18. The principles of the present disclosure are equally applicable to rotary encoders that track relative angular positions of two objects. In rotary encoders the scale typically has a ring or disk shape with a circular or ring-like scale pattern, and a reference system using relative angle θ and a radial dimension r.

In operation, a first light beam 24 from the source 10 illuminates a section of the scale 12. The interaction of the first light beam 24 with the scale 12 produces a second light beam 26 which is directed to the detectors 14 via the optic 16. FIG. 1 depicts a reflective embodiment, but the principles of the present disclosure are equally applicable to embodiments employing a transmissive scale. The second light beam 26 carries a spatial modulation pattern (typically amplitude, phase or both) produced by a pattern on the scale 12 as well as an effect of the optic 16. Examples are described more below. The spatial modulation pattern varies as relative movement occurs between the scale 12 and read head 18. The varying of the spatial pattern is detected by the detectors 14, which produce corresponding electrical signals that are provided to separate electronic circuitry (not shown) that interprets the raw detector signals to extract position information and generate a suitable position indication as an output, e.g., a multi-bit digital value, usable by other circuitry or components for position-based processing or operations.

FIG. 2 is a quasi-schematic depiction of optical features of the scale 12, optic 16 and detectors 14. For each, the X-Y arrangement of features is shown, i.e., these are views along the Z axis of the respective components.

As shown, the scale 12 includes a scale pattern 30 having a set of parallel narrow "tracks" 32 spaced apart in Y. These are divided into incremental tracks 32-I and absolute tracks 32-A, which are interspersed as shown. The optic 16 includes optical features 34, specifically diffraction gratings (DIFF) 36 and lenses (LENS) 38 spaced apart in X. The detectors 14 include respective detector sets or arrays, also spaced apart in X, for sensing incremental and absolute position—these are shown as incremental (INC) detectors 40 and absolute (ABS) detectors 42. In the illustrated embodiment, light from the scale 12 traveling through a given optical feature 36 or 38 is received by a corresponding X-aligned detector 40 or 42. Thus light traveling through the leftmost diffraction grating 36 is received by the leftmost incremental detector 40, etc.

In the illustrated embodiment, there are three incremental detectors 40, and their respective outputs are connected together to generate a composite incremental output signal INCR. There are also two absolute detectors 42, generating respective absolute output signals ABS1 and ABS2. In a typical deployment, the detectors 14 are realized using photodiodes, which generate current in relation to the intensity of incident light. Thus in a configuration like that of FIG. 2, the connecting together of outputs effects summation of the respective photodiode currents. This summing both increases overall signal amplitude and provides a desirable averaging effect.

As shown, the tracks 32 of the scale pattern 30 alternate in the Y direction 22 between periodic incremental tracks 32-I and aperiodic absolute position tracks 32-A. Thus the second light beam 26 from the scale 12 can be viewed as carrying multiple optical patterns or components, each generated by a corresponding individual track 32.

The detectors 14 span multiple tracks 32 in the Y direction 22. In one embodiment, the detectors 14 span the set of all tracks 32 in the Y direction 22, i.e., Y-direction dimension of the detectors 14 is equal to that of the collection of tracks 32, assuming no Y-direction lensing effect. Generally it is desirable that each detector 14 of a given type receive light from all tracks 32 of the corresponding type, i.e., that each incremental detector 40 receives light from all incremental tracks 32-I and each absolute detector 42 receives light from all absolute tracks 32-A. In the illustrated embodiment, each detector 14 actually receives light from all the tracks 32. However, as explained below, the configuration of the optical features 34 and detectors 14 has a filtering effect that causes each detector 40, 42 to respond to the corresponding component or pattern more strongly than the other, i.e., the incremental detectors 40 respond more strongly to the light from the incremental tracks 32-I and the absolute detectors 42 respond more strongly to the light from the absolute tracks 32-A.

While the scale pattern 30 provides spatially separated incremental and absolute tracks 32-I and 32-A, the repetition of each type of track in Y helps to reduce sensitivity to certain types of misalignment or mis-registration between the read head 18 and the scale 12. These include both linear misalignment in Y as well as so-called "yaw", i.e., rotational misalignment about a central Z axis. Thus an encoder may be realized having relatively generous yaw alignment tolerances.

The diffraction gratings 36 are generally fine-pitch periodic patterns (e.g., alternating opaque and transmissive lines or stripes) that produce an incremental optical "fringe pattern" or "fringes" on the respective incremental detectors 40. The incremental detectors 40 may be realized as sets of spaced stripes of photodetector material, with the spacing related to the spatial period of the fringe pattern. In one widely used configuration, there are four sets of stripes offset from each other by 90 spatial degrees. In this configuration, intra-period (interpolated) position can be calculated as an arctangent of the outputs from quadrature-separated stripes.

The lenses 38 are used to form an image of an illuminated section of the absolute tracks on the absolute detectors 42, which are configured to respond to the images in a way that captures the absolute position information. The lenses 38 may be realized in a discrete manner as Fresnel zone plates. Alternatively they may be realized using curved-surface bulk optical elements, analogous to the lenses of eyeglasses.

The absolute detectors 42 are patterned in a way to accurately decode the position information from the absolute tracks. As a simplified illustrative example, the pattern of an absolute track may carry 4 bits of position information and thus identify 16 unique positions across its X extent. In this case, an absolute detector 42 must be able to distinguish among 16 unique X-direction patterns of light. It might include four binary elements for example, with each element receiving a corresponding quarter of the image from an illuminated section of the absolute tracks.

Although the absolute components of the light beam 26 (i.e., the light from the absolute tracks 32-A) also travels through the diffraction gratings 36 and reaches the incremental detectors 40, the response of the detectors 40 to these light components is of much lower magnitude than the response to the incremental components. The use of multiple X-separated gratings 36 as shown can provide spatial averaging that can further reduce the effect of the absolute tracks on the incremental signal INCR. Further filtering in analog and/or digital circuitry can also be used. A separate filtering effect is also used to limit the response of the absolute detectors 42 to light from the incremental tracks 32-I. One typical approach is to make the X-direction width of the photodetector elements an integer multiple of the incremental fringe period, achieving a spatial integration that greatly attenuates the response to the incremental pattern. Other techniques are possible.

Figure 3:
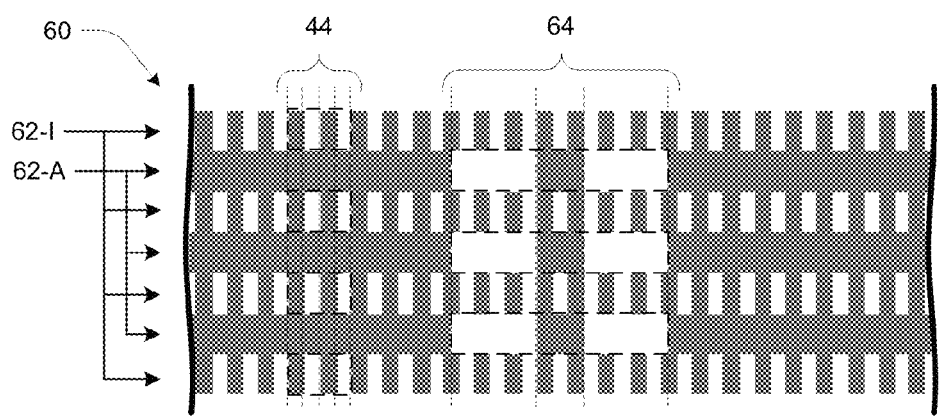
FIG. 3 is a depiction of an alternative scale pattern for an optical position encoder.

FIG. 3 shows another scale pattern 60 that is similar to the scale pattern 30 of FIG. 2 in terms of Y-separated incremental and absolute tracks 62-I, 62-A, but using a special patterning of the absolute tracks 62-A to uniquely identify only one location, which can be used as a positional reference mark for analog or quadrature output encoders. In particular, each absolute track 62-A is everywhere opaque except for an area 64 which is configured as shown. Absolute encoders generally output digital serial communication. Many controllers only accept analog or quadrature encoder outputs with a separate reference position indicator used to find the absolute position. In some embodiments the single unique absolute pattern or code word may be repeated at certain regular locations along the scale axis of travel distances, to allow for more frequent absolute information than provided by a single reference mark.

Although in each of the illustrated examples all the incremental tracks of a given scale pattern (e.g., 32-I for scale pattern 30, 52-I for scale pattern 50) are identical and in particular have identical periods, in alternative embodiments different incremental tracks may have different periods. The differing incremental frequencies may be used to create a larger-period sub-harmonic to link to a coarse absolute track, or they may be combined to form a beat frequency (larger period), again, allowing for a coarse absolute track.

Additionally, the absolute tracks of a given scale pattern (e.g., 32-A for scale pattern 30, 52-A for scale pattern 50) may be different from each other in order to increase the amount of information in a given field of view. This may reduce the required detector size and/or enable increased absolute length of travel. By using an optic 16 between the scale 12 and detector 14 to filter or pass specific signals to different portions of the detector 14, a number of combinations of incremental and absolute track scale features may be used to achieve a desired encoder performance.

While various embodiments of the invention have been particularly shown and described, it will be understood by those skilled in the art that various changes in form and details may be made therein without departing from the scope of the invention as defined by the appended claims.

What is claimed is:

1. An optical position encoder, comprising:
   a scale having multiple tracks separated in a direction perpendicular to travel, the tracks including an incremental track and an absolute track, the scale interacting with an incident first light beam to generate a second light beam having components carrying respective optical patterns produced by the incremental track and absolute track respectively; and
   a set of optical detectors including at least first and second detector arrays of differing properties to detect the respective optical patterns produced by the incremental track and absolute track respectively, each of the first and second detector arrays spanning multiple tracks of the scale and configured to respond to a respective detector-specific component of the second light beam more strongly than to another component of the second beam specific to another of the detector arrays,
   wherein:
   the incremental track is one of a plurality of incremental tracks and the absolute track is one of a plurality of absolute tracks, and the optical patterns carried by the second light beam are produced by the plurality of incremental tracks and the plurality of absolute tracks respectively; and
   each of the first and second detector arrays spans the plurality of incremental tracks and the plurality of absolute tracks to receive the optical patterns of the second light beam produced thereby.

2. The optical position encoder of claim 1, further including an optic disposed between the scale and the set of optical detectors, the optic configured to filter the second light beam to (i) pass predominantly a first component of the second light beam to the first detector array, and (ii) pass predominantly a distinct second component of the second light beam to the second detector array.

3. The optical position encoder of claim 2, wherein the optic includes a diffractive element filtering the first component of the second light beam and passing it to the first detector array.

4. The optical position encoder of claim 2, wherein the optic includes an imaging lens filtering the second component of the second light beam and passing it to the second detector array.

5. The optical position encoder of claim 1, wherein the first and second detector arrays have respective distinct geometries producing the respective stronger responses to the respective components of the second light beam.

6. The optical position encoder of claim 1, wherein the respective stronger responses of the first and second detector arrays to the respective components of the second light beam are produced by a combination of (1) an optic disposed between the scale and the set of optical detectors, and (2) respective distinct geometries of the first and second detector arrays, the optic configured to filter the second light beam to (i) pass predominantly a first component of the second light beam to the first detector array, and (ii) pass predominantly a distinct second component of the second light beam to the second detector array, the respective geometries further strengthening the respective responses of the first and second detector arrays to the respective components.

7. The optical position encoder of claim 6, wherein the optic includes a diffractive element filtering the first component of the second light beam and passing it to the first detector array.

8. The optical position encoder of claim 6, wherein the optic includes an imaging lens filtering the second component of the second light beam and passing it to the second detector array.

9. The optical position encoder of claim 1, wherein the absolute track contains an absolute pattern extending over a distance of travel of the scale to provide absolute position information at locations throughout the distance of travel.

10. The optical position encoder of claim 1, wherein the absolute track contains only one or more short-length absolute patterns identifying respective reference marks used to generate reference output signals for an analog or quadrature output encoder.

11. The optical position encoder of claim 1 wherein the plurality of incremental tracks are interleaved with the plurality of absolute tracks.

* * * * *